(12) United States Patent
Evans et al.

(10) Patent No.: US 7,841,097 B2
(45) Date of Patent: Nov. 30, 2010

(54) METROLOGY APPARATUS

(75) Inventors: Finlay Jonathan Evans, Colerne (GB);
David Roberts McMurtry, Dursley (GB); Colin Ray Bulled, Exeter (GB)

(73) Assignee: Renishaw PLC, Wotton-Under-Edge (GB)

( * ) Notice: Subject to any disclaimer, the term of this patent is extended or adjusted under 35 U.S.C. 154(b) by 85 days.

(21) Appl. No.: 12/308,266

(22) PCT Filed: Jun. 8, 2007

(86) PCT No.: PCT/GB2007/002102

§ 371 (c)(1),
(2), (4) Date: Dec. 11, 2008

(87) PCT Pub. No.: WO2007/144573

PCT Pub. Date: Dec. 21, 2007

(65) Prior Publication Data
US 2009/0260243 A1 Oct. 22, 2009

(30) Foreign Application Priority Data

Jun. 16, 2006 (GB) ................................ 0611985.3
Jun. 30, 2006 (GB) ................................ 0612914.2

(51) Int. Cl.
*G01B 21/04* (2006.01)
*G01B 5/00* (2006.01)
(52) U.S. Cl. ........................................................ 33/502
(58) Field of Classification Search ................. 33/502
See application file for complete search history.

(56) References Cited

U.S. PATENT DOCUMENTS

| | | | |
|---|---|---|---|
| 4,676,002 A | 6/1987 | Slocum | |
| 4,682,418 A | 7/1987 | Tuss et al. | |
| 5,028,180 A | 7/1991 | Sheldon et al. | |
| 5,604,593 A | 2/1997 | McMurtry | |
| 5,681,981 A * | 10/1997 | McMurtry | 73/1.73 |
| 5,870,834 A * | 2/1999 | Sheldon | 33/556 |
| 6,505,495 B1 * | 1/2003 | Blondeau | 73/1.79 |
| 6,626,884 B1 | 9/2003 | Dillon et al. | |
| 6,772,619 B2 * | 8/2004 | Nashiki et al. | 73/1.79 |
| 6,836,323 B2 * | 12/2004 | Schmadel | 356/243.1 |
| 7,040,033 B2 * | 5/2006 | Zhu et al. | 33/502 |
| 7,059,063 B2 * | 6/2006 | Weekers et al. | 33/702 |
| 7,386,408 B2 * | 6/2008 | Nishibashi et al. | 702/94 |
| 2003/0070311 A1 * | 4/2003 | Zhu et al. | 33/502 |
| 2005/0018205 A1 | 1/2005 | Braasch et al. | |
| 2007/0151117 A1 * | 7/2007 | McMurtry | 33/558.2 |
| 2008/0295348 A1 * | 12/2008 | Heiden et al. | 33/502 |
| 2009/0194664 A1 * | 8/2009 | Evans et al. | 248/670 |

FOREIGN PATENT DOCUMENTS

WO WO 03/036226 A1 5/2003

* cited by examiner

*Primary Examiner*—Christopher W Fulton
(74) *Attorney, Agent, or Firm*—Oliff & Berridge PLC

(57) ABSTRACT

Position measurement apparatus, such as hexapod co-ordinate measuring machine, is described that comprises a thrust frame and a metrology frame. The thrust frame comprises a load carrying base connected to a moveable platform by a plurality of powered extendable legs. The metrology frame comprising a metrology base attached to the load carrying base by a base attachment mechanism such as kinematic mounts. The base attachment mechanism is arranged to prevent any distortions of the load carrying base being transmitted to the metrology base.

23 Claims, 7 Drawing Sheets

METROLOGY APPARATUS

The present invention relates to metrology apparatus and in particular to co-ordinate measurement machines, such as non-Cartesian CMMs, having separate thrust and metrology frames.

A variety of non-Cartesian machines are known. For example, hexapod arrangements are described in U.S. Pat. Nos. 5,028,180, 5,604,593 and 6,226,884.

U.S. Pat. No. 5,028,180 describes a hexapod machine tool comprising an upper, moveable, platform that is attached to a base by six hydraulic extendable legs. Each powered leg may comprise integral length measuring means or an arrangement of separate measuring legs may be provided between the platform and the base.

U.S. Pat. No. 5,604,593 describes various hexapod co-ordinate measuring machines. In one example, the hexapod comprises a triangular base structure having three stiff struts that are connected to corner support elements. The first ends of six powered legs are attached to the corner support elements whilst the second ends of the six powered legs are attached to a platform. The platform can thus be moved relative to the base structure by extension or retraction of the powered legs. The lengths of the legs are measured using laser interferometers which may be attached directly to the powered legs in the vicinity of the base or to the corner support elements of the base.

U.S. Pat. No. 6,226,884 describes a further hexapod measurement structure that comprises six pre-calibrated measurement bars. The structure may be placed on a co-ordinate measurement machine for calibration thereof.

According to a first aspect of the invention, position measurement apparatus comprises a thrust frame and a metrology frame, the thrust or load carrying frame comprising a load carrying base connected to a moveable platform by a plurality of powered extendable legs, the metrology frame comprising a metrology base, wherein the metrology base is attached to the load carrying base by base attachment means, the base attachment means being arranged to prevent distortions of the load carrying base being transmitted to the metrology base.

The present invention thus provides position measurement apparatus having a thrust frame and a separate metrology frame. The thrust frame comprises a plurality of powered legs to provide controlled movement of the moveable platform relative to the load carrying base. The base of the metrology frame is attached to the base of the thrust frame by base attachment means. The base attachment means prevent any distorting forces from the load carrying base being transmitted to the metrology base.

The present invention thus provides position measurement apparatus in which any load forces that may occur in the load carrying structure are not passed through to the metrology structure. For example, forces may be present in the thrust frame when the moveable platform is being re-orientated or when heavy objects are placed on the load carrying base. The present invention also ensures that any thermal expansion effects that cause expansion or contraction of the thrust frame do not result in distortion of the metrology structure. Isolating the metrology frame from the thrust frame in this manner thus prevents any substantial distortion of the metrology frame thereby ensuring measurement accuracy is not degraded.

The present invention can thus provide higher accuracy metrology measurements compared with prior art apparatus of the type mentioned above. In particular, such measurements are substantially unaffected by the unavoidable distortions that are present in the thrust frame of metrology apparatus.

Advantageously, the base attachment means provide at least three points of contact between the load carrying base and the metrology base. Conveniently, the base attachment means comprises a kinematic mount. A kinematic mount is preferred, although by no means essential, as it constrains the six degrees of freedom between the metrology base and the load carrying base without providing any redundant constraints.

The kinematic mount may, for example, comprise a cone, a v-groove and flat plate arrangement. A kinematic mount of this type permits the metrology base to be affixed to the load carrying base in such a way that any distorting forces of the load carrying base are not transmitted to the metrology base. Furthermore, such a kinematic mount can allow accurate and repeatable positioning of the metrology base relative to the load carrying base. Advantageously, the base attachment means maintain the metrology base substantially parallel to load carrying base.

The metrology base may conveniently be mounted to the underside of the load carrying base. This prevents the metrology base interfering with access to the apparatus. In order to keep the metrology base and load carrying base in contact, the base attachment means may conveniently comprise at least one magnet. The one or more magnets may be fixed to the metrology base and/or the load carrying base, as appropriate, such that the bases are urged together by the effect of magnetic attraction. In such an arrangement, at least one of the metrology base and load carrying base advantageously comprise a suitable magnetic material. Alternatively, the base attachment means may comprise flexible adhesive or flexible mechanical components to keep the metrology and load carrying bases in contact. Advantageously, flexible mounting components that are flexible along one axis and rigid along the other two axes are used in a configuration that creates a kinematic coupling of the metrology frame and the thrust frame.

Advantageously, the metrology base comprises a plurality of interconnected struts. For example, a triangular arrangement of such struts may be provided.

Advantageously, the metrology frame has a different coefficient of thermal expansion than the thrust frame. Preferably, the metrology frame has a lower coefficient of thermal expansion than the thrust frame. The metrology frame advantageously has a low coefficient of thermal expansion. Advantageously, the metrology frame has a coefficient of thermal expansion less than 15 ppm/° C., more preferably less than 10 ppm/° C., more preferably less than 5 ppm/° C., more preferably less than 3 ppm/° C., more preferable less than 2 ppm/° C., or more preferably less than 1 ppm/° C.

The metrology frame is conveniently formed from INVAR™ which is a nickel-iron alloy that has a coefficient of thermal expansion of around 0.5-1.5 ppm/° C. depending on its exact composition. Alternatively, the metrology frame may be formed from a glass ceramic material such as ZERODUR™. ZERODUR has a coefficient of thermal expansion of around 0.02 ppm/° C. or less depending on the exact composition. Such low thermal expansion coefficients can be seen to be more than an order of magnitude less than those of traditional materials such as Aluminium (23 ppm/° C.) or brass (19 ppm/° C.) which may be used to form the thrust frame.

Providing a metrology frame made from a material having a low coefficient of thermal expansion (e.g. INVAR) prevents any substantial metrology errors being introduced with variations in temperature. However, such materials are often difficult to machine and are typically substantially more expensive than standard workshop materials such as Aluminium. The present invention thus combines the metrology benefits of material such as INVAR with the ease of manufacture associated with Aluminium; e.g. an INVAR metrology frame may be combined with a thrust frame made from traditional materials such as Aluminium.

Conveniently, the metrology base is connected to a moveable metrology platform by a plurality of extendable measurement legs. The metrology platform is conveniently attached to the moveable platform by platform attachment means. The platform attachment means are preferably arranged to prevent distortions of the moveable platform being transmitted to the metrology platform. This prevents any distorting forces from the moveable platform of the thrust frame being transmitted to the metrology platform of the metrology frame. The platform attachment means conveniently provides at least three points of contact between the load carrying platform and the metrology platform. Advantageously, the platform attachment means comprises a kinematic mount.

In this manner, the metrology platform is arranged to move with the moveable platform of the thrust frame. The platform attachment means, which may be of similar type to the base attachment means, prevent any distortions or forces in the moveable platform being transferred to the metrology platform. In this manner, the metrology platform is also isolated from any distortions of the load carrying platform. The metrology platform and moveable (load carrying) platform of the thrust frame may be maintained substantially parallel by the platform attachment means.

Advantageously, the ends of the metrology legs are attached to the metrology base and metrology platform by a plurality of metrology joints. Preferably, said metrology joints comprise ball joints. Ball joints provide the high accuracy positioning that is preferably for metrology purpose.

Preferably, the ends of the powered extendable legs are attached to the load carrying base and the moveable platform via a plurality of load bearing joints. The load bearing joints are conveniently multi-axis revolute joints such as Hooke's joints. Hooke's joints provide a high load carrying, low friction, capability.

Conveniently, a combination pivot joint assembly provides both the metrology joint and the load bearing joint. The pivot joint assembly advantageously comprises; a multi-axis revolute joint portion providing rotational movement about two or more revolute axes, said two or more revolute axes substantially intersecting at an intersection point; and a ball joint portion comprising a ball located in the vicinity of said intersection point. Advantageously, the combination pivot joint assembly is arranged such that the centre of rotation of the ball joint is substantially coincident with the centre of rotation of the multi-axis revolute joint portion. Such a combination pivot joint assembly is described in more detail in Applicant's co-pending international (PCT) patent application (agent's ref: 731) that has a common priority claim with the present application. If such a combination joint is used, the apparatus conveniently comprises a plurality of combination legs, each combination leg comprising a metrology structure and a mechanically separate load bearing structure. Extendable legs assemblies of this type are described in more detail in Applicant's co-pending international (PCT) patent application that claims priority from British patent application 0611985.3 (agents' reference 693).

Preferably, the apparatus comprises a calibration device, the calibration device being attachable to the load carrying base. Preferably, the calibration device is repeatably locatable relative to the load carrying base. The device may comprise at least one protruding calibration member, e.g. a shaft having a ball at its distal end. Having a calibration device and a metrology base that can both be repeatably (e.g. kinematically) attached to the load carrying base provides a calibration device having a known position relative to the metrology base. This enables calibration of measurements taken using the metrology frame.

Advantageously, a controller is provided for controlling extension of the extendable legs. The controller may be a suitably programmed computer.

Advantageously, the moveable platform of the thrust frame has a quill rigidly affixed thereto. The quill may be arranged to have a measurement probe attached or attachable thereto. The measurement probe may be of any known type. Advantageously, the measurement probe comprises an articulating head to provide at least one additional rotational axis of stylus movement.

Advantageously, the load carrying base comprises a workpiece table top (e.g. a granite slab) for supporting an object to be measured. The load carrying base may also conveniently comprise a support frame to which, for example, the workpiece table top is attached.

The load carrying base may be placed on the floor, directly or via appropriate legs, and the load carrying platform may be located above it. Alternatively, the load carrying base may be supported by a further support structure (e.g. a rigid frame) in which case the platform may be located below the load carrying base.

Preferably, the apparatus comprises three or more powered extendable legs. For example, a hexapod type arrangement may be provided having six powered extendable legs. These legs may comprise integral length measurement means as described above, or a plurality of separate measurement legs may be provided.

According to a further aspect of the invention, position measurement apparatus comprises a thrust frame and a metrology frame, the thrust frame comprising a load carrying base connected to a moveable platform by a plurality of powered extendable legs, the metrology frame comprising a metrology base, wherein an attachment device is provided to attach the metrology base to the load carrying base, the attachment device being arranged to prevent distortions of the load carrying base being transmitted to the metrology base.

According to a further aspect of the invention, position measurement apparatus comprises a thrust frame and a metrology frame wherein the metrology frame has a lower coefficient of thermal expansion than the thrust frame.

According to a further aspect of the invention, position measurement apparatus comprises a thrust frame and a metrology frame wherein the thrust frame contacts the ground via one or more support legs, characterised in that the metrology frame is directly attached to said one or more support legs. The metrology frame is thus not attached to the thrust frame but is attached to the support legs that hold the metrology frame apart from the ground (e.g. from the floor). This arrangement prevent any significant deformation of the metrology frame due to loads placed on the thrust frame.

According to a further aspect of the invention, a base portion for a co-ordinate measurement machine comprising a metrology base and a load carrying base, the metrology base being attachable to a plurality of measurement legs, the load carrying base being attachable to a plurality of powered legs, wherein the metrology base is affixed to the load carrying base by base attachment means that prevent any distorting forces from the load carrying base being transmitted to the metrology base.

The invention will now be described, by way of example only, with reference to the accompanying drawings in which.

Figure 1:
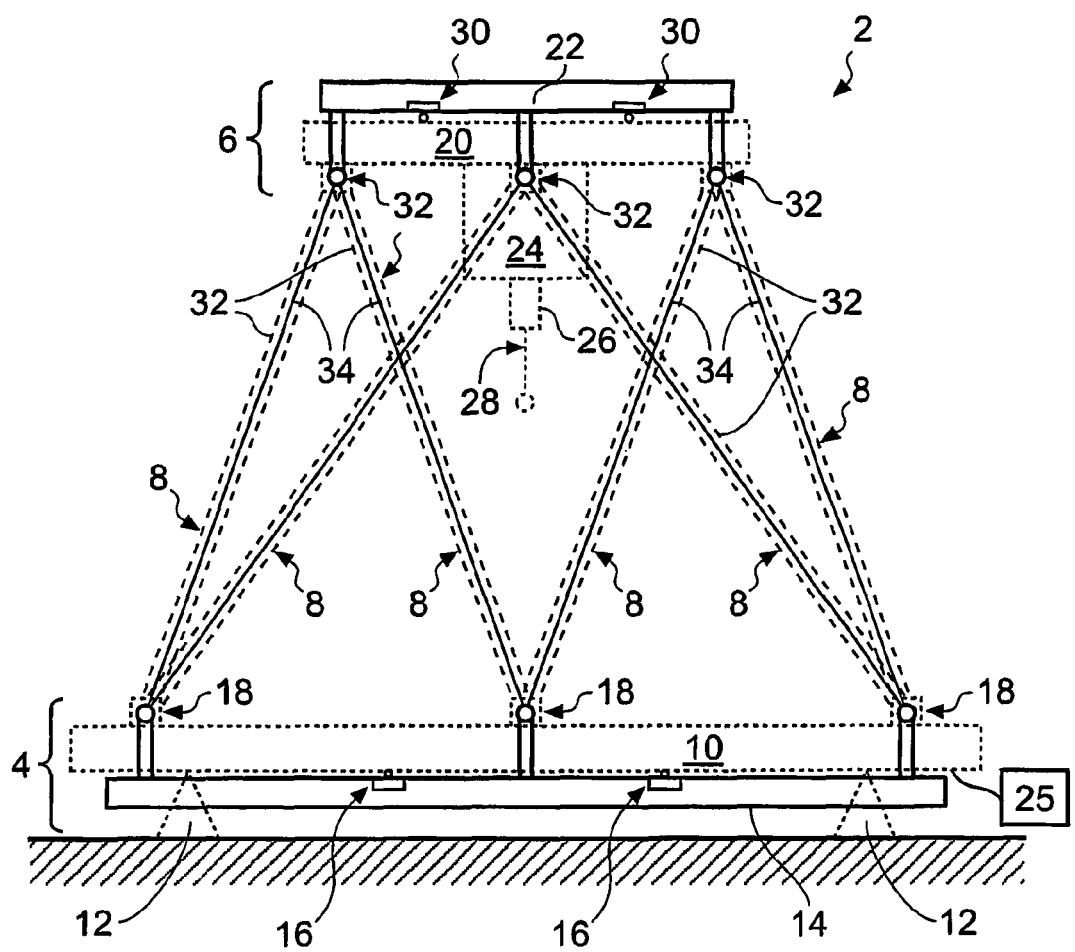
FIG. 1 shows a side-on view of a hexapod CMM of the present invention.
Figure 2:
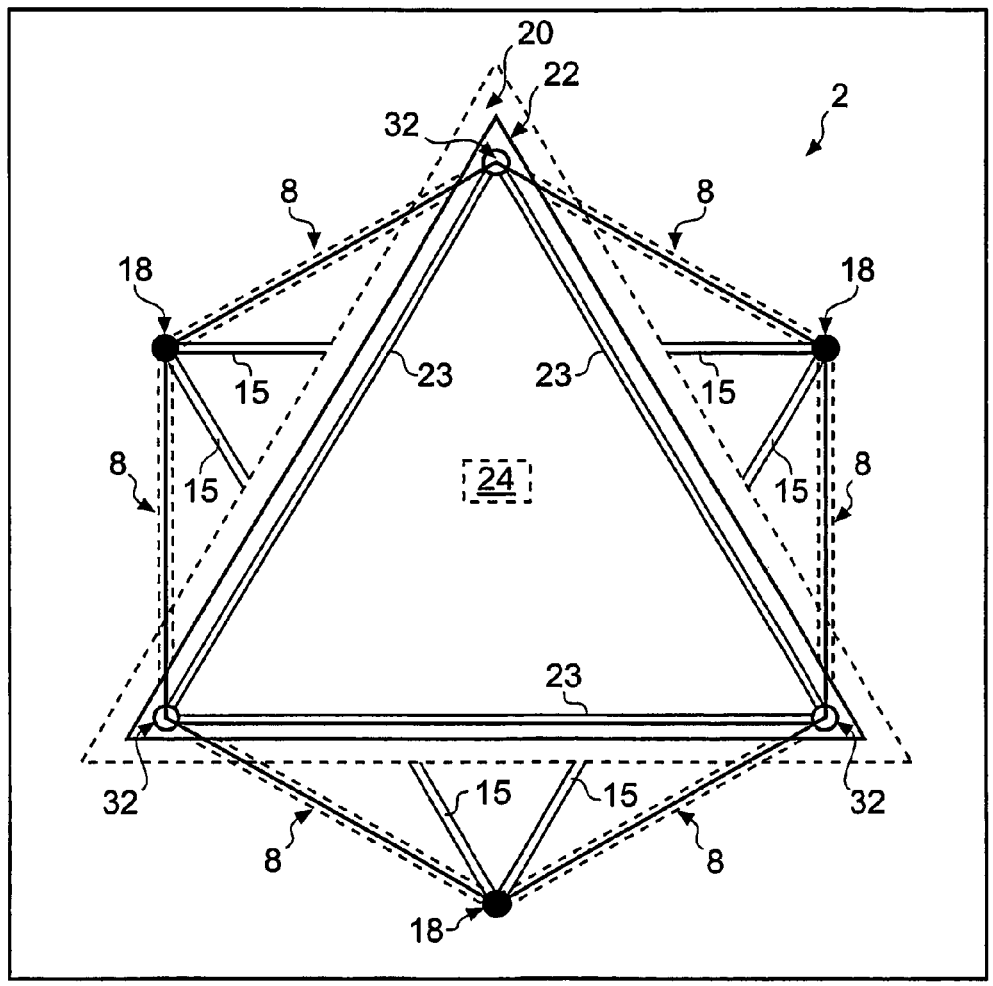
FIG. 2 shows a top view of the hexapod shown in FIG. 1.
Figure 3:
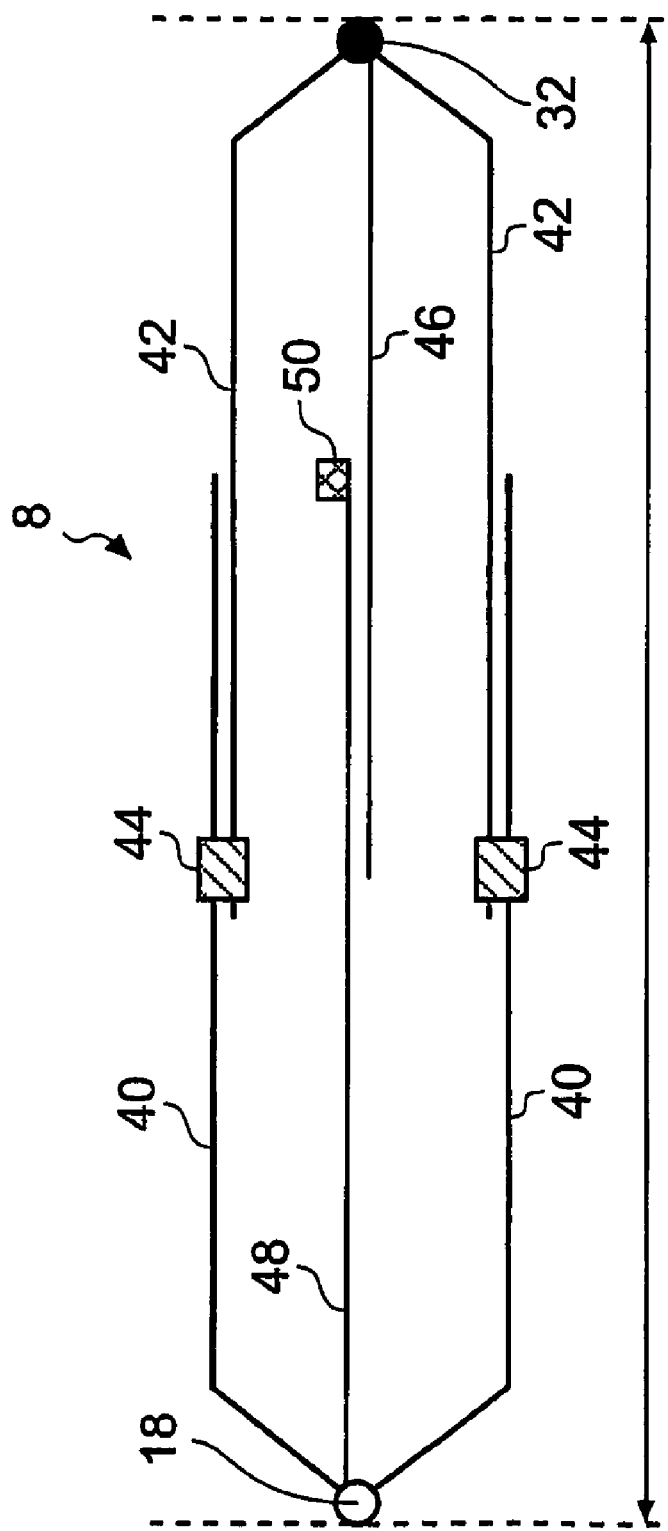
Figure 4:
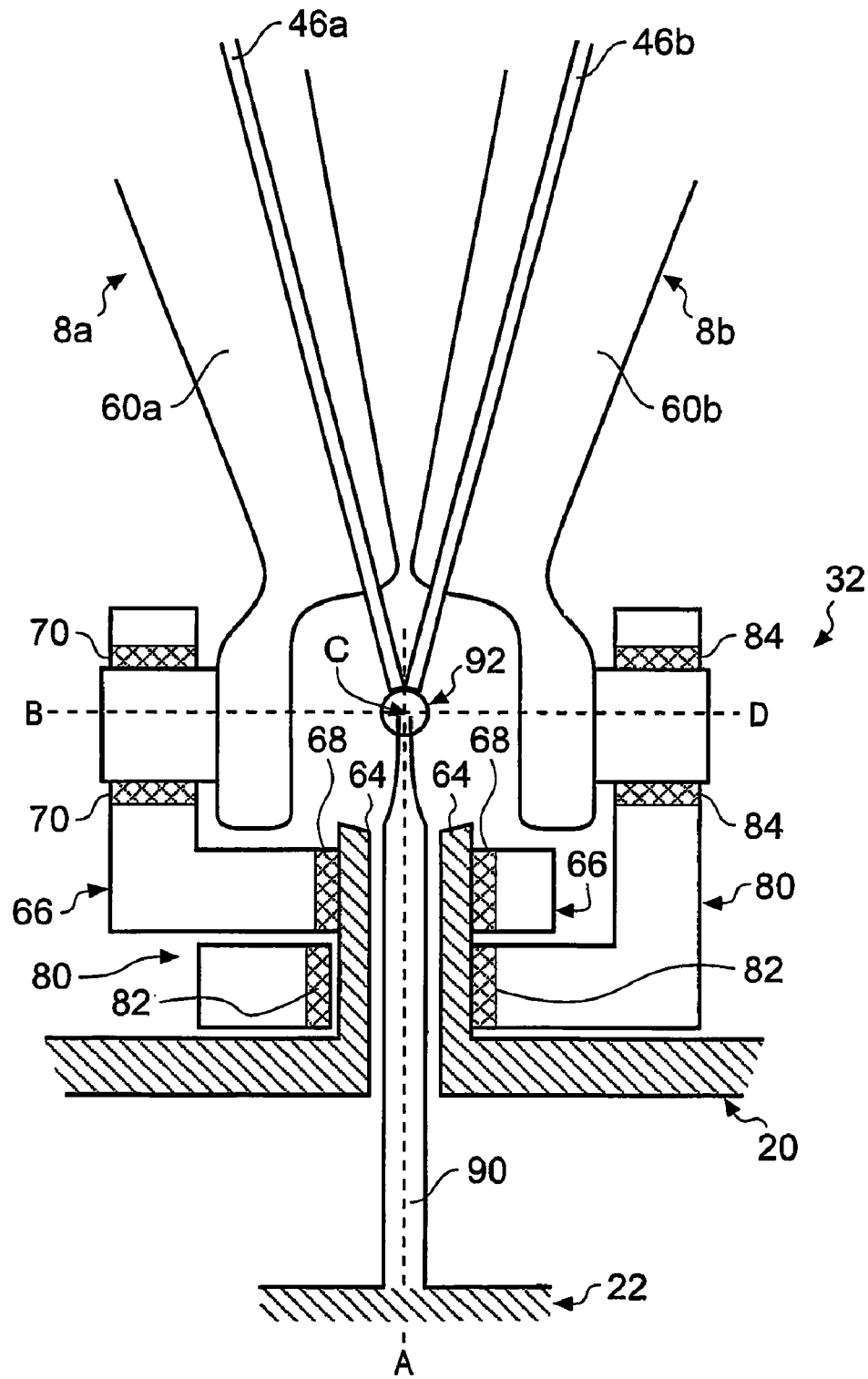
Figure 5:
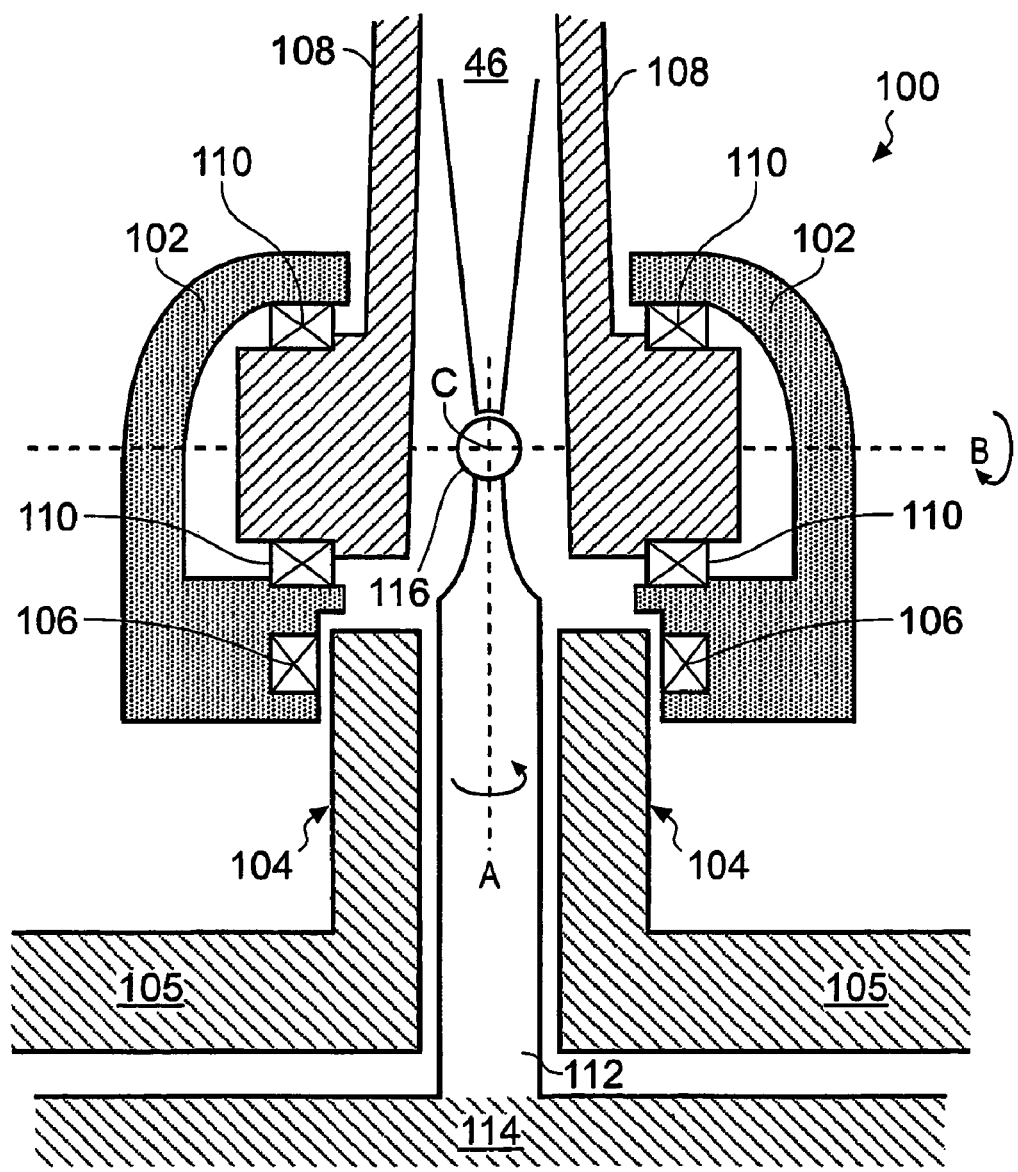
Figure 6:
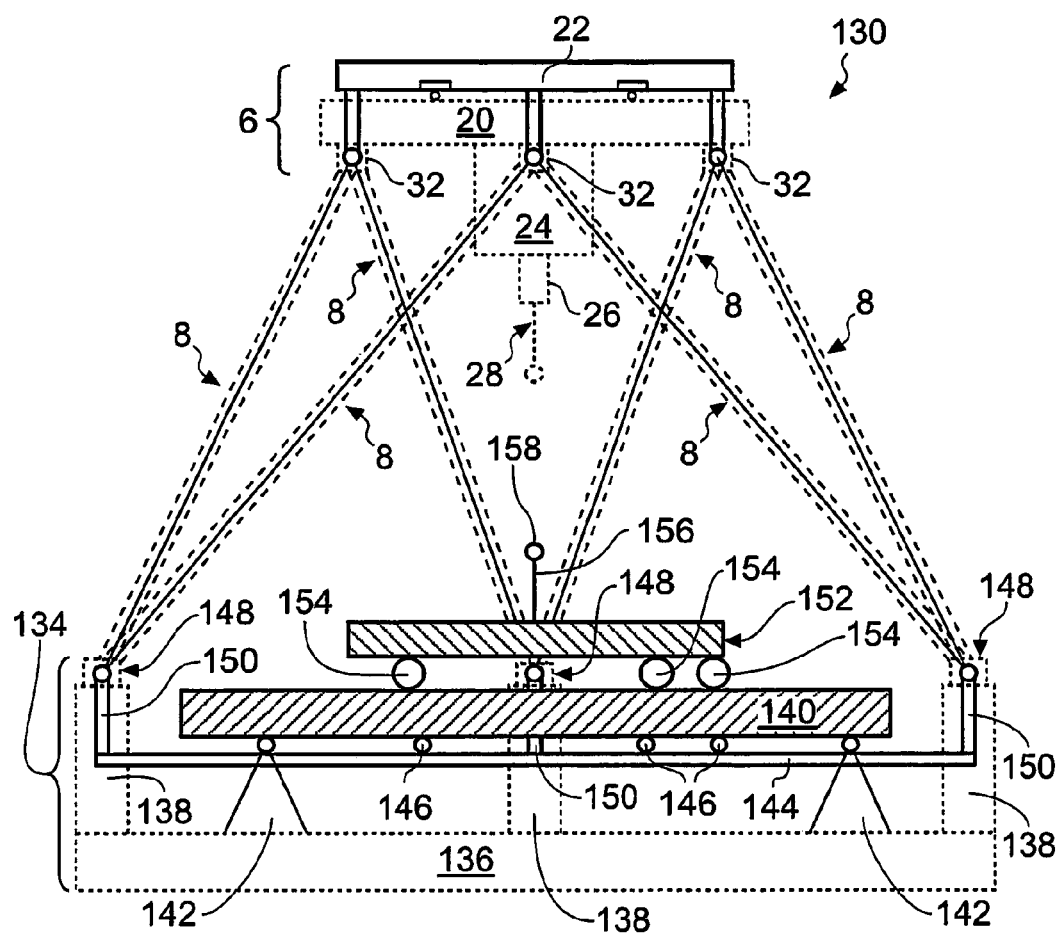
Figure 7:
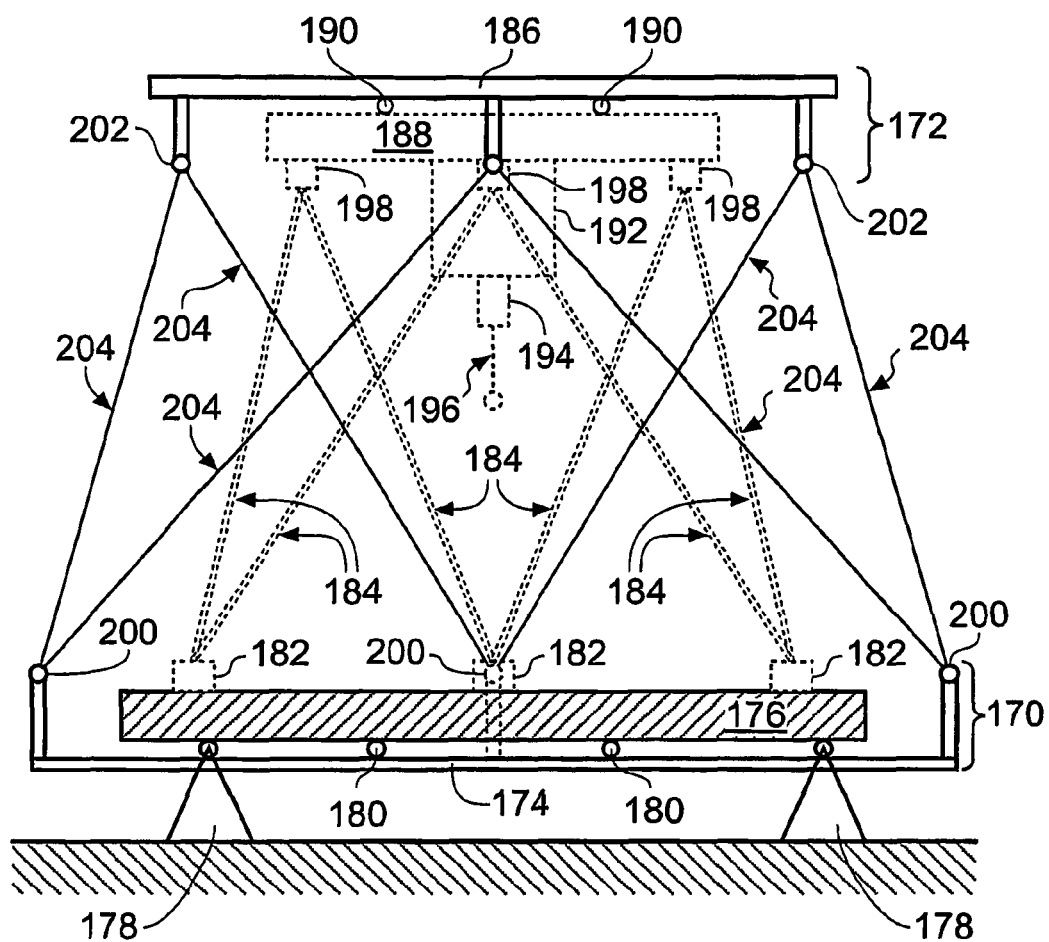

FIG. 3 illustrates an extendable powered leg of the kind shown in FIGS. 1 and 2 in more detail, FIG. 4 illustrates a joint having separate load bearing and metrology paths, FIG. 5 illustrates a further joint having separate load bearing and metrology paths FIG. 6 illustrates a further hexapod CMM of the present invention and FIG. 7 illustrates a hexapod CMM of the present invention having spaced apart load bearing and metrology frames.

Referring to FIGS. 1 and 2, a hexapod co-ordinate measuring machine 2 of the present invention is illustrated. In particular, FIGS. 1 and 2 show side-on and top views of the hexapod CMM 2 respectively.

The hexapod CMM 2 comprises a base portion 4 and a moveable platform portion 6 that are spaced apart by six extendable legs 8.

The base portion 4 comprises a load bearing base 10, such as granite slab, that is grounded via a plurality of support legs 12. A metrology base 14 that includes a triangular framework of INVAR struts 15 is mounted to the underside of the load bearing base 10 by mounts 16. Each mount 16 includes a magnet and a kinematic locating means. The mounts 16 are arranged to ensure that the metrology base 14 is maintained in a well defined, repeatable, position relative to the load bearing base 10 in such a way that no force or load is transmitted from the load bearing base 10 to the metrology base 14. Three joints 18 are also provided that separately couple the load bearing base 10 and the metrology base 14 to the extendable legs 8.

The moveable platform portion 6 comprises a load bearing platform 20 and a metrology platform 22. The metrology platform 22 comprises a triangular framework of INVAR struts 23 and is attached to the load bearing platform 20 via mounts 30. The mounts 30 locate the load bearing platform 20 relative to the metrology platform 22 but are arranged such that no load is passed to the metrology platform 22 from the load bearing platform 20. Three joints 32 are also provided that separately couple the load bearing platform 20 and the metrology platform 22 to the extendable legs 8. In this example, the mounts 30 and joint 32 are the same type as the mounts 16 and joints 18 of the base.

A quill 24 is attached to the underside of the load bearing platform 20 and is arranged to retain a measurement probe 26 having a stylus 28 with a spherical stylus tip. The measurement probe may be a touch trigger probe or any measurement probe of known type.

The six extendable legs 8 that link the base portion 4 and the moveable platform portion 6 each have a load bearing structure (indicated by dotted lines 32) and a metrology structure (indicated by the solid lines 34). The metrology structure 34 of legs is mechanically isolated from the load bearing structure 32. The extendable legs 8 also comprise drive means (e.g. a motor) to extend/retract the legs. The metrology structure 34 of the legs 8 is formed from INVAR and also comprises means (e.g. an optical encoder) for measuring leg length. The structure of the extendable legs 8 is described in more detail below with reference to FIG. 3.

The joints 18 of the base portion 4 and the joints 32 of the moveable platform portion 6 allow the load bearing base 10 to be linked to the load bearing platform 20 via the load bearing structure 32 of the extendable legs. The same joints 18 also allow the metrology base 14 to be linked to the metrology platform 22 via the metrology structure 34 of the legs. The arrangement of the joints and legs is such that separate load and metrology frames are provided thereby ensuring that any distortion of the load carrying components does not cause distortion of the metrology frame. Furthermore, the metrology frame (i.e. the metrology base 14, the metrology platform 22 and the metrology structure 34 of the extendable legs) are all formed from INVAR™. INVAR has a low coefficient of thermal expansion and the metrology frame is thus substantially unaffected by any changes in the thermal environment. The kinematic mounts 16 and 30 between the metrology frame and the load carrying frame also ensure that no distortion of the metrology frame is induced by thermal expansion of the load carrying parts of the apparatus.

In use, an object (e.g. a workpiece) to be measured is placed on the load bearing base 10. The length of each extendable leg 8 is controlled by an associated computer controller 25. Altering the length of the various legs allows the moveable platform portion 6, and hence the quill 24, to be moved relative to the base. This arrangement allows the form of the object to be measured.

Referring to FIG. 3, an extendable leg 8 of the above described hexapod is illustrated.

The extendable leg 8 comprises an outer tubular portion 40 and an inner tubular portion 42. The inner tubular portion 42 is slidable within the outer tubular portion 40 thereby forming a telescopically extendable leg. Although inner and outer tubular portions are shown in FIG. 3, it should be noted that any kind of telescopic arrangement may be provided. A drive means 44 allows expansion and contraction of the leg as required. The drive means 44 is illustrated schematically in FIG. 3 and may comprise any arrangement that introduces relative axial motion between the inner and outer tubular portions. For example, the drive means may be a hydraulic piston, screw jack or may comprise an electronic drive arrangement. In use, the drive means 44 causes expansion and contraction of the extendable leg thereby urging the base portion 4 and moveable platform portion 6 apart, or pulling them together, as required. The load is transmitted through the extendable leg 8 via the tubular portions.

In addition to the tubular (load bearing) portions 40 and 42, the extendable leg 8 also comprises a separate metrology structure. The metrology structure comprises a first metrology member 46 and a second metrology member 48.

The first metrology member 46 is an elongate member on which a optical scale is formed. Movement of the first end of the first metrology member 46 along the axis of the leg 8 is constrained only in the vicinity of the joint 32. The second end of the first metrology member 46 is free to move longitudinally, although it may be supported by the surrounding inner tubular portion 42 so as to prevent lateral movements.

The second metrology member 48 is also in the form of an elongate member. Movement of the first end of the second metrology member 48 along the axis of the leg 8 is constrained only in the vicinity of the joint 18. The second end of the second metrology member 48 is thus free to move longitudinally, although it may be supported by the surrounding outer tubular portion 40 so as to prevent radial movements. The second end of the second metrology member 48 carries an optical readhead 50 that is suitable for reading the optical scale of the first metrology member 46. In this manner, any relative movement between the first and second members can be measured. Although an optical scale and readhead arrangement is shown in FIG. 3, it should be noted that non-optical position encoders (e.g. magnetic or capacitance systems) could alternatively be used.

The first and second metrology members 46 and 48 are fabricated from INVAR which, as noted above, is a material having a low coefficient of thermal expansion. Also, it should be remembered that the first and second metrology members 46 and 48 are not axially constrained by the inner and outer tubular portions 40 and 42 of the leg. Therefore, any thermal expansion or distortion of the inner and outer tubular portions 40 and 42 is not transmitted to the first and second metrology members 46 and 48.

Each extendable leg 8 thus has integral metrology means for measuring length that are unaffected by any thermal expansion or contraction of the load bearing structure of that leg. The arrangement thus provides a metrology structure through which no load is transmitted. In other words, the extendable leg 8 could be said to comprise a load bearing structure (i.e. the tubular portions 40 and 42) that is separate from the metrology structure (i.e. the metrology members 46 and 48).

Referring now to FIG. 4 a joint 32 of the above described hexapod is shown in more detail. As outlined above, joint 32 allows the load bearing and metrology structures of two extendable legs 8a and 8b to be coupled to the load bearing platform 20 and metrology platform 22 respectively.

The joint 32 is arranged to receive a first load bearing end member 60a that is located at the end of an inner tubular portion 42 of extendable leg 8a. A metrology member 46a of leg 8a is also received by the joint 32. A second load bearing end member 60b and metrology member 46b are also received from a second extendable leg 8b.

The joint 32 comprises a central load structure 64 that is anchored to the load bearing platform 20. A first carriage 66 is mounted to the central load structure 64 via bearings 68 in such a manner that it can rotate about a first axis of rotation A. The first load bearing end member 60a carries a protrusion that allows it to be rotatably mounted to the first carriage 66 via bearings 70 such that it is rotatable about a second axis of rotation B. Axes A and B substantially intersect at a point C and the joint 32 thus allows the first load bearing end member 60a to rotate about a centre point C with two rotational degrees of freedom.

A second carriage 80 is also mounted to the central load structure 64 via bearings 82 in such a manner that it is rotatable about an axis that is substantially coincident with the first axis of rotation A. The second load bearing end member 60b carries a protrusion such that it can be rotatably mounted to the second carriage 80 via bearings 84 such that it is rotatable about a further axis of rotation D which also substantially intersects the centre point C. In this manner, the joint 32 also allows the second load bearing end member to rotate substantially about the centre C with two rotational degrees of freedom.

The central structure 64 has an aperture through which an elongate member 90 is passed. One end of the elongate member 90 is attached to the metrology platform 22 whilst the other end carries a ball 92. The centre of the ball 92 is arranged to substantially coincide with the centre C. The metrology members 46a and 46b of the two extendable legs make direct contact with the ball 92. Appropriate sockets (not shown) may be provided to keep the end of the metrology members 46a and 46b in contact with the ball 92 or the metrology members may be spring loaded to provide such contact. Although the elongate member 90 is passed through an aperture in the central structure 64, it should be noted that it may pass through any appropriate part of the joint structure.

Joint 32 thus allows two extendable arms of the type described with reference to FIG. 3 above to be attached to load carrying and metrology platforms. The outer Hooke's joint arrangement provides the load bearing couplings whilst the metrology paths are provided via a ball joint.

In this example, the structure of joint 18 of the base portion 4 is similar to the structure of joint 32 of the moveable platform portion 6; joint 18 providing separate couplings to the load bearing base 10 and the metrology base 14.

Referring to FIG. 5 a variant of the joint described with reference to FIG. 4 is illustrated. The joint 100 shown in FIG. 5 is suitable for connecting a single extendable leg to load bearing and metrology platforms. This may be required where variants of the hexapod design described with reference to FIGS. 1 to 4 are implemented; for example, in a hexapod of the type described in our International (PCT) patent application that claims the priority of British patent application No. 0611979.6. (agents' reference 691).

The joint 100 comprises a carriage 102 that is mounted to a central load structure 104 via bearings 106 in such a manner that it can rotate about a first axis of rotation A. The load bearing structure 104 is mounted to a load bearing platform 105. A load bearing end member 108 from the extendable arm carries a protrusion such that it can be rotatably mounted to the carriage 102 via bearings 110 such that it is rotatable about a second axis of rotation B such that axis A and axis B substantially intersect at point C. In this manner, the joint 100 allows the load bearing end member 108 to rotate about a centre C with two rotational degrees of freedom.

The central load structure 104 has an aperture through which an elongate member 112 is passed. One end of the elongate member 112 is attached to an associated metrology platform 114 whilst the other end carries a ball 116. The centre of the ball 116 is arranged to substantially coincide with the centre C. A metrology member 46 of the extendable leg make direct contact with the ball 116. Appropriate sockets (not shown) may be provided to keep the end of the metrology member 46 in contact with the ball 116 or the metrology member may be spring loaded to provide such contact.

Referring to FIG. 6, an alternative hexapod structure 130 of the present invention is illustrated. The hexapod 130 comprises a moveable platform portion 6 and extendable legs 8 that are similar to those described above. The hexapod 130 also comprises a base portion 134 having a modified configuration to that described above.

The base portion 134 comprises a load bearing base frame 136 having three protruding supports arms 138. The base frame 136 supports a workpiece table top 140 via support legs 142. A metrology base 144 is attached to the underside of the workpiece table top 140 by mounts 146 that include a magnet and kinematic locating means. Mounts 146 ensure the metrology base is retained in a well defined position relative to the table top 140 of the load carrying base without any load being transmitted thereto.

The protruding support arms 138 of the load bearing base frame 136 each carry a joint 148. The joint 148 is of a similar type to the joint described with reference to FIG. 4 above. The metrology base 144, which is formed as a triangular arrangement of support struts, also comprises arms 150 that terminate at the joints 148. In a similar manner to that described above, the load bearing base frame 136 and the metrology base 144 are thus separately coupled to the load carrying and metrology structures of the arms 8.

A calibration device 152 is also illustrated which can be kinematically located on the workpiece table top 140 via mounts 154. The calibration device 152 comprising an upstanding calibration member 156 having a calibration ball 158 at its distal end. The calibration device 152 allows a repeatable reference position relative to the metrology base 144 to be determined. In use, the calibration device 152 is removed from the apparatus and the object is located directly on the workpiece table top 140.

Although providing integrated load bearing and support legs is described above, a similar arrangement could also be implemented using spatially separated metrology and load bearing frames. Such apparatus will be described with reference to FIG. 7.

Referring to FIG. 7, a hexapod CMM is shown having a base portion 170 and a moveable platform portion 172.

The base portion 170 comprises a metrology base 174 and a load carrying base 176. The load carrying base is grounded by supports 178 and the metrology base 174 is attached to the load carrying base 176 by mounts 180. The mounts include magnets and kinematic locating means such that the metrology base 174 is held in a defined position relative to the load carrying base 176 but no load is passed from the load carrying base 176 to the metrology base 174.

The moveable platform portion 172 comprises a metrology platform 186 attached to a load carrying platform 188 by mounts 190. The mounts 190 include kinematic locating means such that the metrology platform 186 is held in a defined position relative to the load carrying platform 188 but no load is passed from the load carrying platform 188 to the metrology platform 186. A quill 192 is mounted to the underside of the load carrying platform 188 and carries a measurement probe 194 having a stylus 196.

Three Hooke's joints 182 are provided on the load carrying base 176 and three Hooke's joints 198 are provided on the load carrying platform 188. Extendable, powered, legs 184 are provided between the Hooke's joints 182 of the base and the Hooke's joints 198 of the moveable platform. Each Hooke's joint is arranged to receive two powered legs 184 to provide a hexapod thrust frame. The powered legs 184 can thus drive the position of the moveable platform portion 172 relative to the base portion 174.

Three ball joints 200 are provided on the metrology base 174 and three further ball joints 202 are provided on the metrology platform 186. Six measurement legs 204 extend between the ball joints of the metrology base 174 and the metrology platform 186. Each measurement leg 204 includes means for measuring its length. Measuring the length of each measurement leg 204 thus allows the relative position of the metrology base 174 and metrology platform 186 to be determined. This, in turn, allows the measurement of the position of the moveable platform portion 172 relative to the base portion 174.

The invention claimed is:

1. Position measurement apparatus comprising a thrust frame and a metrology frame, the thrust frame comprising a load carrying base connected to a moveable platform by a plurality of powered extendable legs, the metrology frame comprising a metrology base, wherein the metrology base is attached to the load carrying base by base attachment means, the base attachment means being arranged to prevent distortions of the load carrying base being transmitted to the metrology base.

2. An apparatus according to claim 1 wherein the base attachment means provide at least three points of contact between the load carrying base and the metrology base.

3. An apparatus according to claim 1 wherein the base attachment means comprises a kinematic mount.

4. An apparatus according to claim 1 wherein the base attachment means comprise at least one magnet.

5. An apparatus according to claim 1 wherein the metrology base comprises a plurality of interconnected struts.

6. An apparatus according to claim 1 wherein the metrology frame has a lower coefficient of thermal expansion than the thrust frame.

7. An apparatus according to claim 1 wherein the metrology base is connected to a moveable metrology platform by a plurality of extendable measurement legs, wherein the metrology platform is attached to the moveable platform by platform attachment means that prevent distortions of the moveable platform being transmitted to the metrology platform.

8. An apparatus according to claim 7 wherein the platform attachment means provide at least three points of contact between the load carrying platform and the metrology platform.

9. An apparatus according to claim 8 wherein the platform attachment means comprises a kinematic mount.

10. An apparatus according to claim 7 wherein the ends of the measurement legs are attached to the metrology base and metrology platform by a plurality of metrology joints.

11. An apparatus according to claim 10 wherein said metrology joints comprise ball joints.

12. An apparatus according to claim 10 wherein the ends of the powered extendable legs are attached to the load carrying base and the moveable platform via a plurality of load bearing joints, and wherein a combination joint provides both a metrology joint and a load bearing joint.

13. An apparatus according to claim 12 comprising a plurality of combination legs, each combination leg comprising a metrology structure and a mechanically separate load bearing structure.

14. An apparatus according to claim 1 wherein the ends of the powered extendable legs are attached to the load carrying base and the moveable platform via a plurality of load bearing joints.

15. An apparatus according to claim 14 wherein said load bearing joints are Hooke's joints.

16. An apparatus according to claim 1 comprising a calibration device attachable to the load carrying base, wherein the calibration device is repeatably locatable relative to the load carrying base.

17. An apparatus according to claim 1 comprising a controller for controlling extension of the extendable legs.

18. An apparatus according to claim 1 wherein the moveable platform has a quill rigidly affixed thereto, wherein a measurement probe is attached to the quill.

19. An apparatus according to claim 1 wherein the load carrying base comprises a workpiece table top.

20. An apparatus according to claim 1 wherein the load carrying base comprises a support frame.

21. An apparatus according to claim 1 comprising three or more powered extendable legs.

22. An apparatus according to claim 1 comprising six powered extendable legs.

23. Position measurement apparatus comprising a thrust frame and a metrology frame, the thrust frame comprising a load carrying base connected to a moveable platform by a plurality of powered extendable legs, the metrology frame comprising a metrology base, wherein an attachment device is provided to attach the metrology base to the load carrying base, the attachment device being arranged to prevent distortions of the load carrying base being transmitted to the metrology base.

* * * * *